US006872351B2

(12) United States Patent
Weihrauch

(10) Patent No.: US 6,872,351 B2
(45) Date of Patent: Mar. 29, 2005

(54) METHOD FOR MARKING MONOFILAMENTS

(75) Inventor: Georg Weihrauch, Wald-Michelbach (DE)

(73) Assignee: Coronet-Werke GmbH, Wald-Michelbach (DE)

( * ) Notice: Subject to any disclaimer, the term of this patent is extended or adjusted under 35 U.S.C. 154(b) by 223 days.

(21) Appl. No.: 10/284,271

(22) Filed: Oct. 31, 2002

(65) Prior Publication Data

US 2003/0047843 A1 Mar. 13, 2003

Related U.S. Application Data

(62) Division of application No. 09/701,655, filed as application No. PCT/EP99/03807 on Jun. 2, 1999, now Pat. No. 6,500,296.

(30) Foreign Application Priority Data

Jun. 16, 1998 (DE) ......................... 198 26 414

(51) Int. Cl.$^7$ ............................. D01D 5/34; D01F 1/10; D06M 10/00; H01S 3/00
(52) U.S. Cl. .................... 264/400; 264/78; 264/172.15; 264/210.6; 264/464; 264/482
(58) Field of Search ............................ 264/78, 172.15, 264/210.6, 400, 464, 482

(56) References Cited

U.S. PATENT DOCUMENTS 4,613,470 A * 9/1986 Aftalion ..................... 264/464

* cited by examiner

*Primary Examiner*—Leo B. Tentoni
(74) *Attorney, Agent, or Firm*—Paul Vincent

(57) ABSTRACT

Methods for the use of laser beams in the case of plastic monofilaments are proposed. For the optical marking of extruded monofilaments or individual monofilaments of a monofilament union, at least the monofilament to be marked, accompanied by the addition of additives reacting with a color change under laser action, are extruded and treated with laser beams in the areas corresponding to the desired marking.

9 Claims, No Drawings

METHOD FOR MARKING MONOFILAMENTS

This application is a divisional of application Ser. No. 09/701,655 filed Nov. 30, 2000, now U.S. Pat. No. 6,500,296 which is a nationalization of PCT/EP99/03807 filed on Jun. 2, 1999 and also claims Paris Convention priority to DE 198 26 414 filed on Jun. 16, 1998 the entire disclosure of which are hereby incorporated by reference.

BACKGROUND OF THE INVENTION

The invention is directed to a method for marking monofilaments or individual monofilaments within a monofilament group.

Monofilaments are produced by extrusion from virtually any polymers. Extrusion takes place with cross-sections adapted to the subsequent use of the monofilament. Thus, it is possible to produce extremely thin fibers, bristles and strands. The term "monofilaments" is understood to mean all continuously extruded monofilaments with diameters ranging from fibers to bristles for industrial purposes, even though subsequently, in exemplified manner, reference is mainly made to bristles.

In many cases there is a need for bristle material of monofilaments with different characteristics. The provision of bristles formed from two or more monofilaments has hitherto been unsuccessful in that multicore bristles could only be produced by adhesion or coating in an inadequate manner and only accompanied by a loss of their characteristics. Multicore, twisted bristles, during use and at least at the ends, have undesirably separated again. Integrally or positively engaging connections between several, initially individually extruded monofilament cores have not hitherto existed.

There is a special need for bristles formed from monofilament cores of different types. The combination of monofilament cores, e.g. from hard thermoplastics and soft elastomers leads to new effects. This also applies regarding the combination of monofilament cores with abrasive and non-abrasive action. Combined bristle actions more particularly result from the combination of monofilament cores of different cross-sections such as e.g. the connection of round and polygonal or otherwise profiled monofilament cores. In many cases the effects can be increased, if other monofilament cores are wound in spiral or crossing, wide or narrow-meshed manner around one or more axially positioned monofilament cores. In place of encircling, it is also possible to use other entwining methods.

SUMMARY OF THE INVENTION

In view of the above, it is the object of the invention to propose a method for the optical marking of extruded monofilaments or individual monofilaments of a monofilament union which are, following extrusion, stretched and subsequently stabilized.

According to the invention, this problem is solved in that at least the monofilament or monofilaments to be marked, accompanied by the addition of additives reacting under laser action with a color change, undergoes extrusion and is treated with laser beams in the areas corresponding to the desired marking, wherein the treatment with laser radiation takes place after stretching and/or after stabilization. The additives can have different absorption characteristics for laser beams.

DESCRIPTION OF THE PREFERRED EMBODIMENT

The invention offers the possibility of conventionally extruding an individual monofilament or monofilaments within a union and subsequently to mark same in the desired manner, in that the color change occurring under laser action with correspondingly chosen additives is utilized. It is in particular possible to make markings as order or ordering means, e.g. in order to bring together for specific brushware bristles marked in a specific manner from a bristle supply or store. In addition, with such a marking a specific use form can be indicated and once again used as order means. Such a marking can in particular be used as a use indication on a finished brush. This is e.g. desired for toothbrushes, as well as technical or industrial brushes, in order to ensure a replacement of the brush or the bristles in good time.

Depending on the function of the marking, the monofilament to be marked can be treated in punctiform or linear manner along its sheath using laser beams. Instead of this, the monofilament to be marked can be treated in at least one radial plane with a laser beam, so that when a bristle becomes worn the marked radial plane is exposed and the necessary replacement indicated.

In particular, the monofilaments can be stabilized after laser beam treatment.

DE-A-43 34 75 discloses labeling plastic components, in particular for laboratory apparatus, using laser radiation. However, this process is used in relatively large injection molded components which are labeled during the final manufacturing stages. In contrast, the method of the invention concerns marking monofilaments having diameters of a fraction of a millimeter up to a few millimeters, wherein the marking is used for further processing (sorting) or for marking a plurality of monofilaments for later use (indication of state of use or wear).

With concentrically co-extruded monofilaments of two or more components it is possible to provide one or more of the inner monofilament layers with LS-absorbing additives. If this only takes place in predetermined length portions and if such a monofilament is treated with laser beams, the color change only occurs on said length portion. This also makes it possible to implement a scale or use indication.

Monofilaments with different absorption coefficients for laser beams (LS) can be used and at least zonally contacted at the circumferential surface thereof and by the introduction of laser beams into the contact area, can be melted together or positively joined, wherein introduction of the laser radiation occurs prior to stretching and/or following stretching, and/or following stabilization.

The laser source can e.g. be $CO_2$ lasers, diode lasers, neodymium lasers or excimer lasers. As a result of the parallel nature of the beams and optionally with the aid of masks or deflecting scanners, with such lasers it is possible to bring about a very precise positioning. If the monofilaments have different absorption coefficients, either as a material characteristic or the addition of additives, the monofilaments can be melted together in the contact area and this may only occur locally. In addition, by means of laser beams, the heat supplied in the absorption area and therefore the melting volume can be very precisely controlled, so that even with a small contact surface it is ensured that a melting or welding together occurs throughout the contact area.

If a melting of the materials of the monofilaments is impossible, because e.g. one of the monofilaments is not formed by a thermoplastic material, a positive connection can be obtained. The material of the monofilament formed from a thermoplastic material melts due to the introduction of laser beams, expands and flows in such a way that the monofilament which does not or melts in a less pronounced manner is bound in, particularly if said monofilament has no smooth surface.

U.S. Pat. No. 4,441,227 discloses cutting monofilaments to lengths of bristles, packaging the bristles together, inserting the densely packed bristle package into a frame which is part of a brush handle, and subsequently coupling laser radiation into the free ends of the bristles at the back side of the brush. The outer surfaces of the bristles are thereby connected to each other and the bristles disposed at the periphery are connected to the frame. The disclosure therefore concerns a method for attaching finished bristles to a bristle carrier. To the extent that the outer surfaces of the bristles are joined together, the method serves only to generate a package and to attach the package to the bristle carrier. The properties and possible uses for the bristles themselves are not influenced in any manner. This is also the case for another conventional method (DE-A-196 06 416) with which free-standing bristles are connected to the bristle carrier by coupling laser radiation into the free ends of the bristles, the bristles being e.g. permeable to laser light, wherein the opposite ends of the bristles are welded to the bristle carrier.

After extrusion, the monofilaments can be brought into direct contact, e.g. in parallel position to multicore strands. It is also possible for the monofilaments to be co-extruded in two-core, multicore or concentric form. In this case as a result of the laser treatment the intimate connection takes place via the contacting circumferential surfaces. Following the introduction of the laser beams, the monofilaments can be stabilized. If, during manufacture of the monofilament, the laser beams are only introduced following the stabilization of the monofilaments, an additional stabilization stage is performed.

As has already been indicated, it is possible to use monofilaments made from polymers with different LS absorption coefficients and the LS absorption in the interface is utilized for heat production.

However, preferably, at least one of two monofilaments to be joined together can be mixed with additives having a higher LS absorption coefficient than the surrounding polymer. It can be titanium dioxide, carbon black and metals or metal oxides, particularly in pigment form. In this case the polymer is melted on in the direct environment of the additive. In the case of certain polymers and additives the melting process is linked with a microfoaming process, which is desired in many applications, because it e.g. ensures a better integral engagement and positive engagement.

This method can also be performed in such a way that monofilaments with additives are mainly used in the area close to the sheath, so that the melting process is essentially limited to the interface area of the monofilament.

The monofilaments are mainly interconnected in a parallel position, however, it is possible for at least one monofilament to be entwined by a further monofilament and to connect it in the contact area to the inner monofilament.

Monofilaments or individual monofilaments of a monofilament union, which are stretched following extrusion and then stabilized can be structurally modified. The term structural modification is mainly understood to mean changes to the surface and/or internal structure.

The monofilament or monofilaments to be structurally changed can be extruded with LS-absorbing additives and treated with laser beams prior to stretching and/or following stretching and/or following stabilization.

In the case of such treated monofilaments in the additives and/or in the immediate environment of the additives affected by the laser radiation, microfoam structures form, which can be used for surface structuring or also for structuring the monofilament core, in order to influence the softness, liquid absorptivity, etc. This foaming process can be locally defined or limited by corresponding additive dimensioning or multicomponent monofilament structures, as well as the depth action of laser beams. The microfoam formation can also be utilized in order to e.g., in the case of co-extruded monofilaments, to inflate the inner or outer monofilament and consequently utilize the change of structure in only one of the two monofilaments or improve the union of monofilaments. The monofilament can thereby in particular be stabilized following introduction of the laser radiation.

With parallel-co-extruded monofilaments with optionally different cross-sectional shapes, as a result of LS-absorption in a single monofilament it is possible to utilize its thermal expansion for modifying the monofilament shape.

By the addition of additives absorbing LS to a varying extent or by the addition of LS-absorbing additives in different concentrations in the individual monofilaments, it is possible to favorably influence and control the aforementioned characteristics.

During extrusion, LS-absorbing additives can be added, which at the same time fulfil a further technical function during monofilament use. In place of this it is possible to add additives with such a technical function in addition to the LS-absorbing additives.

In the case of the additives with an additional technical function, they can be abrasive bodies made from different materials, which with conventional extrusion frequently have an inadequate binding into the polymer and undergo a firmer binding in by the subsequent laser treatment with local melting process in the vicinity of the abrasive bodies. However, it is also possible to add bodies which liquefy or gasify as a result of the subsequent laser treatment.

I claim:

1. A method for the optical marking of monofilaments, the method comprising the steps of:
    a) treating a monofilament material with additives reacting to laser light with a color change;
    b) extruding said monofilament material into a monofilament to be marked;
    c) stretching said monofilament;
    d) stabilizing said monofilament; and e) treating said monofilament with laser light at areas corresponding to a desired marking, wherein said additives have different absorption coefficients for said laser light.

2. The method of claim 1, wherein step e) precedes step c).

3. The method of claim 1, wherein step c) is precedes step e).

4. The method of claim 1, wherein step d) precedes step e).

5. The method of claim 1, wherein step e) comprises treating said monofilament to be marked with laser beams along its outer surface in at least one of a punctiform and linear manner.

6. The method of claim 1, wherein step e) comprises treating said monofilament with laser beams in at least one radial plane.

7. The method of claim 1, wherein step e) precedes step d).

8. The method of claim 1, wherein step b) comprises concentrically co-extruding monofilaments from at least two components and further comprising providing an inner monofilament layer with laser light absorbing additives.

9. The method of claim 8, wherein said inner monofilament layer is only treated with laser light along predetermined length portions.

* * * * *